(12) United States Patent
Kalluri et al.

(10) Patent No.: US 11,715,191 B2
(45) Date of Patent: Aug. 1, 2023

(54) METHOD AND SYSTEM FOR AUTOMATED PLANT SURVEILLANCE AND MANIPULATION

(71) Applicant: UT-Battelle, LLC, Oak Ridge, TN (US)

(72) Inventors: Udaya C. Kalluri, Knoxville, TN (US); Andrzej Nycz, Knoxville, TN (US); Lonnie J. Love, Knoxville, TN (US); Vincent C. Paquit, Knoxville, TN (US); Xiaohan Yang, Knoxville, TN (US); Samuel C. Leach, Knoxville, TN (US); Harold Walters, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 278 days.

(21) Appl. No.: 17/237,503

(22) Filed: Apr. 22, 2021

(65) Prior Publication Data

US 2021/0334952 A1    Oct. 28, 2021

Related U.S. Application Data

(60) Provisional application No. 63/080,846, filed on Sep. 21, 2020, provisional application No. 63/014,314, filed on Apr. 23, 2020.

(51) Int. Cl.
*G01R 33/50* (2006.01)
*G06T 7/00* (2017.01)
*B25J 9/16* (2006.01)

(52) U.S. Cl.
CPC .......... *G06T 7/0004* (2013.01); *B25J 9/1697* (2013.01); *G06T 2207/30188* (2013.01)

(58) Field of Classification Search
CPC ........ G06T 5/50; G06V 10/143; G01R 33/50; G01V 3/32
See application file for complete search history.

(56) References Cited

U.S. PATENT DOCUMENTS 6,567,537 B1 * 5/2003 Anderson ................ G06T 5/50
382/110
9,018,950 B2 * 4/2015 Li .......................... G01R 33/50
324/309

(Continued)

OTHER PUBLICATIONS

Altpeter, F. et al., "Advancing Crop Transformation in the Era of Genome Editing", The Plant Cell, Jul. 2016; pp. 1510-1520; vol. 28.

*Primary Examiner* — Yosef Kassa
(74) *Attorney, Agent, or Firm* — Scully, Scott, Murphy & Presser, P.C.

(57) ABSTRACT

A method and a system for automated plant surveillance and manipulation are provided. Pursuant to the method and the system, images of target plants are obtained through a machine vision system having multiple cameras. The obtained images of the target plants are processed to determine tissue candidates of the target plants and to determine a position and an orientation of each tissue candidate. A tool is manipulated, based on the position and the orientation of each tissue candidate, to excise each tissue candidate to obtain tissue samples. The tissue samples are transported for subsequently manipulation including live processing of the tissue samples or destructive processing of the tissue samples.

50 Claims, 9 Drawing Sheets

(56) References Cited

U.S. PATENT DOCUMENTS

| | | | | |
|---|---|---|---|---|
| 10,123,525 | B2* | 11/2018 | Paoluccio | A01M 21/04 |
| 11,200,427 | B2* | 12/2021 | Periaswamy | G06V 20/52 |
| 2017/0086402 | A1* | 3/2017 | Meadows-Smith | A01H 1/00 |
| 2018/0255688 | P1* | 9/2018 | Moen | A01H 6/1456 |
| | | | | Plt./357 |

* cited by examiner

METHOD AND SYSTEM FOR AUTOMATED PLANT SURVEILLANCE AND MANIPULATION

CROSS REFERENCE TO RELATED APPLICATION

This application claims the benefit of priority from U.S. Provisional Application No. 63/014,314, filed Apr. 23, 2020 and U.S. Provisional Application No. 63/080,846, filed Sep. 21, 2020, the contents of which are incorporated herein by reference.

STATEMENT REGARDING FEDERALLY SPONSORED RESEARCH OR DEVELOPMENT

This disclosure was made with government support under a research project supported by Prime Contract No. DE-AC05-00OR22725 awarded by the U.S. Department of Energy. The government has certain rights in this disclosure.

BACKGROUND

A major bottleneck in plant functional genomics currently is the existence of a mismatch in throughput of gene sequencing and candidate gene identification, and the throughput of gene function validation (via plant variant assessment). Plant transformation approaches used to generate plant variants using candidate genes are currently implemented manually with low throughput. The standard way of performing plant transformation with DNA constructs requires manual labor for manipulation, picking, excising, transferring and labeling of plants. Thus, the entire process is highly reliant on human labor and precision. In addition, the manual steps also pose a major productivity bottleneck in plant transformation approaches. These manual steps (all by hands) include plant delivery and handling, sample excision, transportation to liquid media, waiting time, sample recovery from liquid media, transferring to solid media and handling.

Considering the above disadvantages of the traditional process, there would be a significant advantage for an automated plant transformation method and system that can significantly boost the current plant transformation throughput.

SUMMARY OF THE DISCLOSURE

In one aspect, the disclosure provides a method for automated plant surveillance and manipulation. The method includes obtaining images of at least one target plant through a machine vision system including a plurality of cameras. The method further includes processing the images of the at least one target plant to determine at least one tissue candidate of the at least one target plant and to determine a position and an orientation of each of the at least one tissue candidate. The method further includes manipulating a tool, based on the position and the orientation of said each of the at least one tissue candidate, to excise said each of the at least one tissue candidate to obtain a sample of said each of the at least one tissue candidate. The method additionally includes transporting the sample for manipulation.

In some embodiments, the manipulation includes live processing of the sample.

In some embodiments, the manipulation includes destructive processing of the sample.

In some embodiments, the method includes moving the at least one target plant through an automatic transportation system with respect to a detection range of the machine vision system.

In some embodiments, the automatic transportation system includes a rotating stage for rotating the at least one target plant with respect to the detection range of the machine vision system and a translating stage for linearly moving the at least one target plant with respect to the detection range of the machine vision system.

In some embodiments, the obtaining images of the at least one target plant through the machine vision system includes obtaining color images, multispectral images, or hyperspectral images of the at least one target plant, through the machine vision system, for assessing a property of said each of the at least one tissue candidate and for determining the position and the orientation of said each of the at least one tissue candidate. The plurality of cameras include a color camera being configured to provide color images, multispectral images, or hyperspectral images of the top of the at least one target plant.

In some embodiments, the at least one tissue candidate includes a plant part of the at least one target plant and the property includes a quality of the plant part.

In some embodiments, the plant part is a leaf.

In some embodiments, the quality of the leaf is the greenness, size, or shape of the leaf.

In some embodiments, the quality is a spectral signature within or outside the visible range.

In some embodiments, the obtaining images of the at least one target plant through the machine vision system includes obtaining 3D images of the at least one target plant, through the machine vision system, for assessing a property of said each of the at least one tissue candidate and for determining the position and the orientation of said each of the at least one tissue candidate. The machine vision system further includes a 3D imaging system for obtaining the 3D images.

In some embodiments, the at least one tissue candidate includes a plant part of the at least one target plant and includes of a property of a plant part.

In some embodiments, the method further includes processing the 3D images to determine a path for moving the tool based on the position and the orientation of said each of the at least one tissue candidate.

In some embodiments, the sample is subjected to transformation.

In some embodiments, the transformation is achieved by a method selected from agrobacterium-mediated transformation, viral vector-mediated transformation, polyethylene glycol (PEG)-mediated transformation, liposome-mediated transformation, nanoparticle-mediated transformation, electroporation, and particle gun transformation.

In some embodiments, the method further includes subjecting the sample to destructive processing and extraction.

In some embodiments, the transporting the sample includes transporting the sample into an infection medium including liquid culture of agrobacterium carrying a DNA construct of interest.

In some embodiments, the transporting the sample includes transporting the sample into a sequencing medium.

In some embodiments, the method further includes obtaining images of the sample in the liquid medium through the machine vision system; processing the images of the sample to determine whether to move the sample into a solid medium; and based on a determination of moving the sample into the solid medium, transporting the sample into the solid medium. The solid medium includes a solid callus container for shoot induction.

In some embodiments, the at least one tissue candidate includes a plurality of tissue candidates each selected from a group consisting of a shoot, a root, a leaf, an apex, a node, and an internode of the target plant.

In some embodiments, the at least one target plant includes a plurality of target plants.

In another aspect, the disclosure provides a method for automated plant surveillance and manipulation. The method includes obtaining images of at least one target plant through a machine vision system including a plurality of cameras. The method further includes processing the images of the at least one target plant to determine the position and an orientation of each of the at least one target plant. The method also includes manipulating a tool, based on the position and the orientation of said each of the at least one target plant, to deposit an agent on (i) each of the at least one target plant or (ii) each medium of the at least one target plant.

In some embodiments, the agent includes a microbial or chemical agent.

In another aspect, the disclosure provides a system for automated plant surveillance and manipulation. The system includes a hardware processor and a memory coupled with the hardware processor. The hardware processor is configured to at least: obtain images of at least one target plant through a machine vision system including a plurality of cameras; process the images of the at least one target plant to determine at least one tissue candidate of the at least one target plant and to determine a position and an orientation of each of the at least one tissue candidate; manipulate a tool, based on the position and the orientation of said each of the at least one tissue candidate, to excise said each of the at least one tissue candidate to obtain a sample of said each of the at least one tissue candidate; and transport the sample into a liquid medium.

In some embodiments, the hardware processor is further configured to move the at least one target plant through an automatic transportation system with respect to a detection range of the machine vision system. The automatic transportation system includes a rotating stage for rotating the at least one target plant with respect to the detection range of the machine vision system and a translating stage for linearly moving the at least one target plant with respect to the detection range of the machine vision system.

In some embodiments, the system further includes an actuator station that is independent of the tool.

In some embodiments, the tool includes a robotic arm.

In some embodiments, the hardware processor is further configured to obtain color images or multispectral images or hyperspectral images of the at least one target plant, through the machine vision system, for assessing a predetermined property of said each of the at least one tissue candidate and for determining the position and the orientation of said each of the at least one tissue candidate. The plurality of cameras include a color camera being configured to provide images of the top of the at least one target plant.

In some embodiments, the plurality of cameras is configured to take color images or multispectral images or hyperspectral images.

In some embodiments, the at least one tissue candidate includes a leaf of the at least one target plant and the property includes a quality of the leaf.

In some embodiments, the quality of the leaf is the greenness, the size, or the shape.

In some embodiments, the quality is a spectral signature within or outside the visible range.

In some embodiments, the hardware processor is further configured to obtain 3D images of the at least one target plant, through the machine vision system, for assessing a predetermined property of said each of the at least one tissue candidate and for determining the position and the orientation of said each of the at least one tissue candidate. The machine vision system further includes a 3D imaging system for obtaining the 3D images.

In some embodiments, the at least one tissue candidate includes a leaf of the at least one target plant and the property includes a shape of the leaf.

In some embodiments, the hardware processor is further configured to process the 3D images to determine a path for moving the tool based on the position and the orientation of said each of the at least one tissue candidate.

In some embodiments, the sample is subjected to transformation.

In some embodiments, the transformation is achieved by a method selected from agrobacterium-mediated transformation, viral vector-mediated transformation, polyethylene glycol (PEG)-mediated transformation, liposome-mediated transformation, nanoparticle-mediated transformation, electroporation, and particle gun transformation.

In some embodiments, the hardware processor is further configured to transport the sample into a transformation medium.

In some embodiments, the transformation medium is an infection medium including liquid culture of agrobacterium carrying a DNA construct of interest.

In some embodiments, the transporting the sample includes transporting the sample into a tissue culture medium, an infection medium or a sample preserving medium.

In some embodiments, the hardware processor is further configured to obtain images of the sample in the liquid medium through the machine vision system; process the images of the sample to determine whether to move the sample into a solid medium; and based on a determination of moving the sample into the solid medium, transport the sample into the solid medium. The solid medium includes a solid callus container for shoot induction.

In some embodiments, the at least one tissue candidate includes a plurality of tissue candidates each selected from a group consisting of a shoot, a root, a leaf, an apex, a node, and an internode of the target plant.

In some embodiments, the at least one target plant includes a plurality of target plants.

In another aspect, the disclosure provides a system for automated plant surveillance and manipulation. The system includes a hardware processor and a memory coupled with the hardware processor. The hardware processor is configured to at least: obtain images of at least one target plant through a machine vision system including a plurality of cameras; process the images of the at least one target plant to determine the position and an orientation of each of the at least one target plant; manipulate a tool, based on the position and the orientation of said each of the at least one target plant, to deposit an agent on (i) each of the at least one target plant or (ii) each medium of the at least one target plant.

In some embodiments, the agent is a microbial or chemical agent.

In another aspect, the disclosure provides a computer program product for implementing plant transformation. The computer program product includes a computer readable storage medium having program instructions embodied therewith. The program instructions are executable by a processing element of a device to cause the device to: obtain images of at least one target plant through a machine vision system including a plurality of cameras; process the images of the at least one target plant to determine at least one tissue candidate of the at least one target plant and to determine a position and an orientation of each of the at least one tissue candidate; manipulate a tool, based on the position and the orientation of said each of the at least one tissue candidate, to excise said each of the at least one tissue candidate to obtain a sample of said each of the at least one tissue candidate; and transport the sample into a liquid medium.

In another aspect, the disclosure provides a computer program product for manipulating a plant. The computer program product includes a computer readable storage medium having program instructions embodied therewith. The program instructions are executable by a processing element of a device to cause the device to: obtain images of at least one target plant through a machine vision system including a plurality of cameras; process the images of the at least one target plant to determine the position and an orientation of each of the at least one target plant; manipulate a tool, based on the position and the orientation of said each of the at least one target plant, to deposit an agent on (i) each of the at least one target plant or (ii) each medium of the at least one target plant.

In some embodiments, the agent is a microbial or chemical agent.

In another aspect, the disclosure provides a method for automated surveillance and manipulation. The method includes obtaining images of at least one target subject through a machine vision system comprising a plurality of cameras. The method further includes processing the images of the at least one target subject to determine at least one part of the at least one target subject and to determine a position and an orientation of each of the at least one part. The method also includes manipulating a tool, based on the position and the orientation of the each of the at least one part, to obtain a sample of each of the at least one part to obtain a sample of the each of the at least one part. The method additionally includes transporting the sample for manipulation.

In some embodiments, the target subject is a target plant, and the part is a tissue candidate of the target plant.

In some embodiments, the target subject is a target anchoring media supporting a plant, and wherein the at least one part of the anchoring media is a solid, gel-like or particulate matter such as agar, phytagel, sand, soil or artificial soil.

BRIEF DESCRIPTION OF THE FIGURES

The file of this patent contains at least one drawing executed in color. Copies of this patent with color drawing(s) will be provided by the Patent and Trademark Office upon request and payment of the necessary fee.

DETAILED DESCRIPTION OF THE DISCLOSURE

In addition, the figures are illustrative rather than limiting, and thus are not necessary drawn in accordance with scales.

Figure 1:
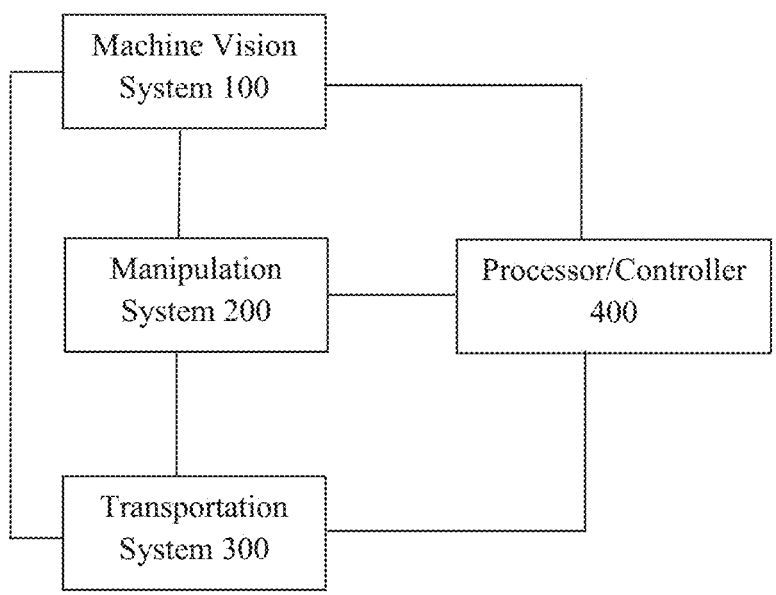
FIG. 1 is a schematic block diagram showing a system for automated plant surveillance and manipulation.

Illustrative embodiments of the present disclosure provide a system 10 for automated plant surveillance and manipulation. As shown in FIG. 1, the automated plant surveillance and manipulation system 10 includes a machine vision system 100, a manipulation system 200, a transportation system 300, and a hardware processor 400 that is programmed to control the status, modes, and operations of the machine vision system 100, the manipulation system 200, and the transportation system 300.

Figure 2:
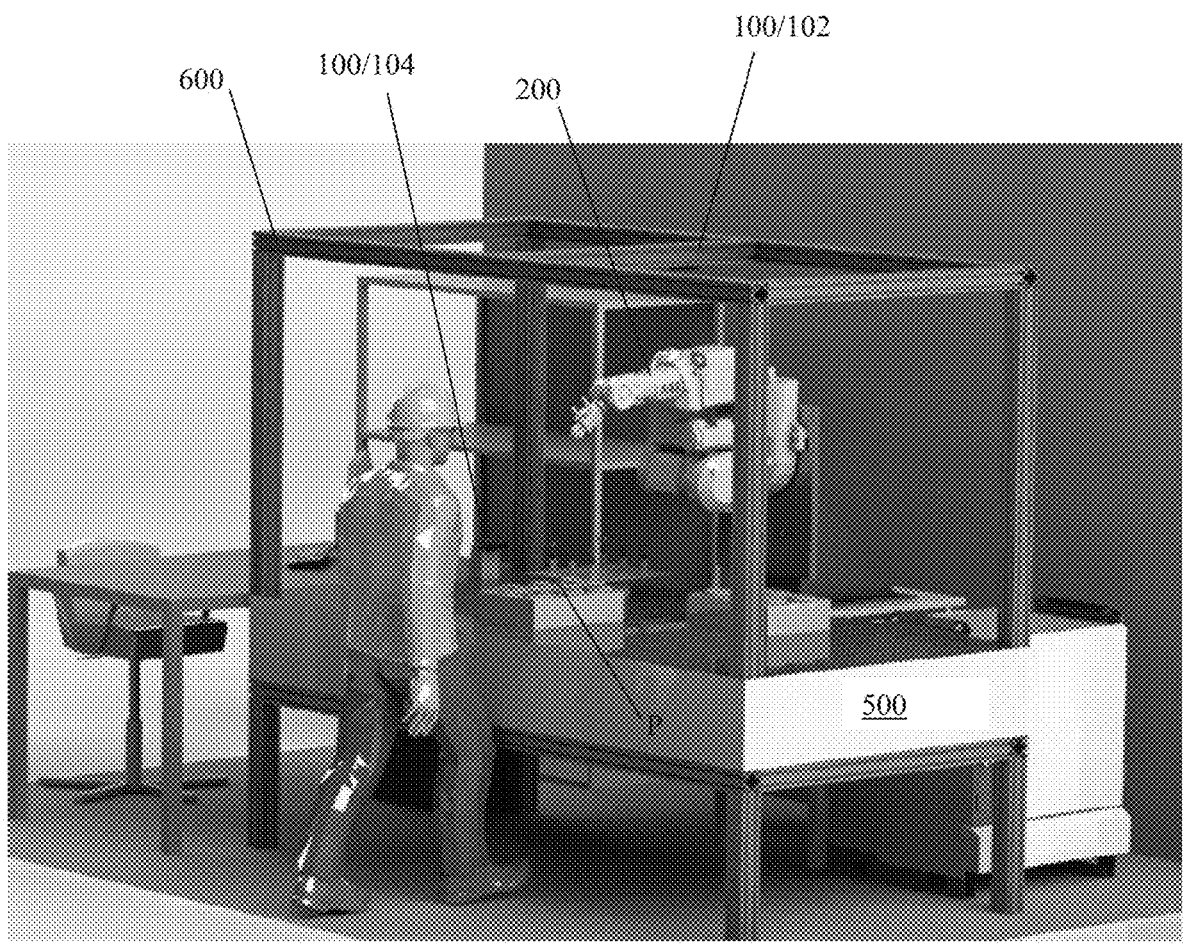
FIG. 2 is a schematic view of the system shown in FIG. 1.
Figure 3:
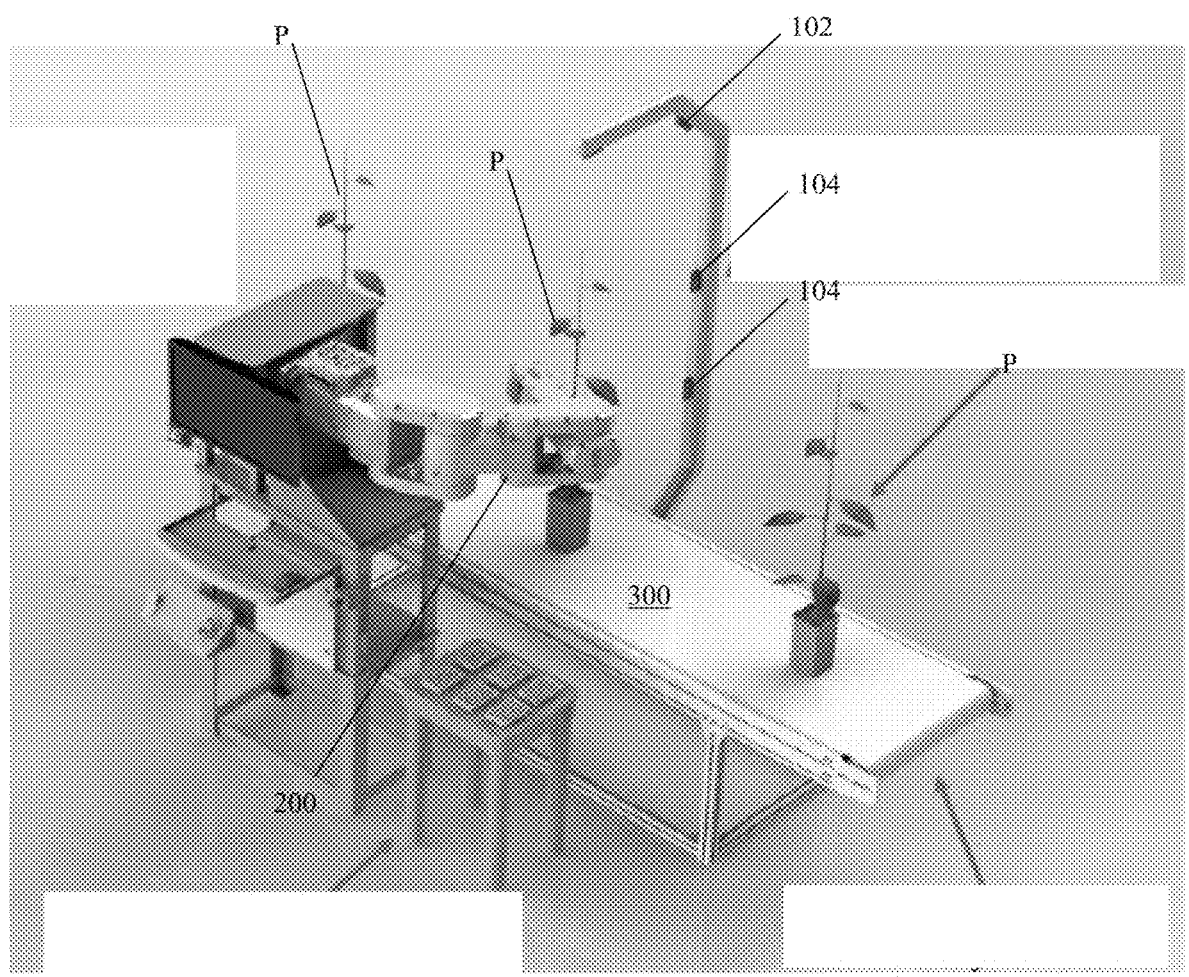
FIG. 3 is another schematic view showing the system.
Figure 4:
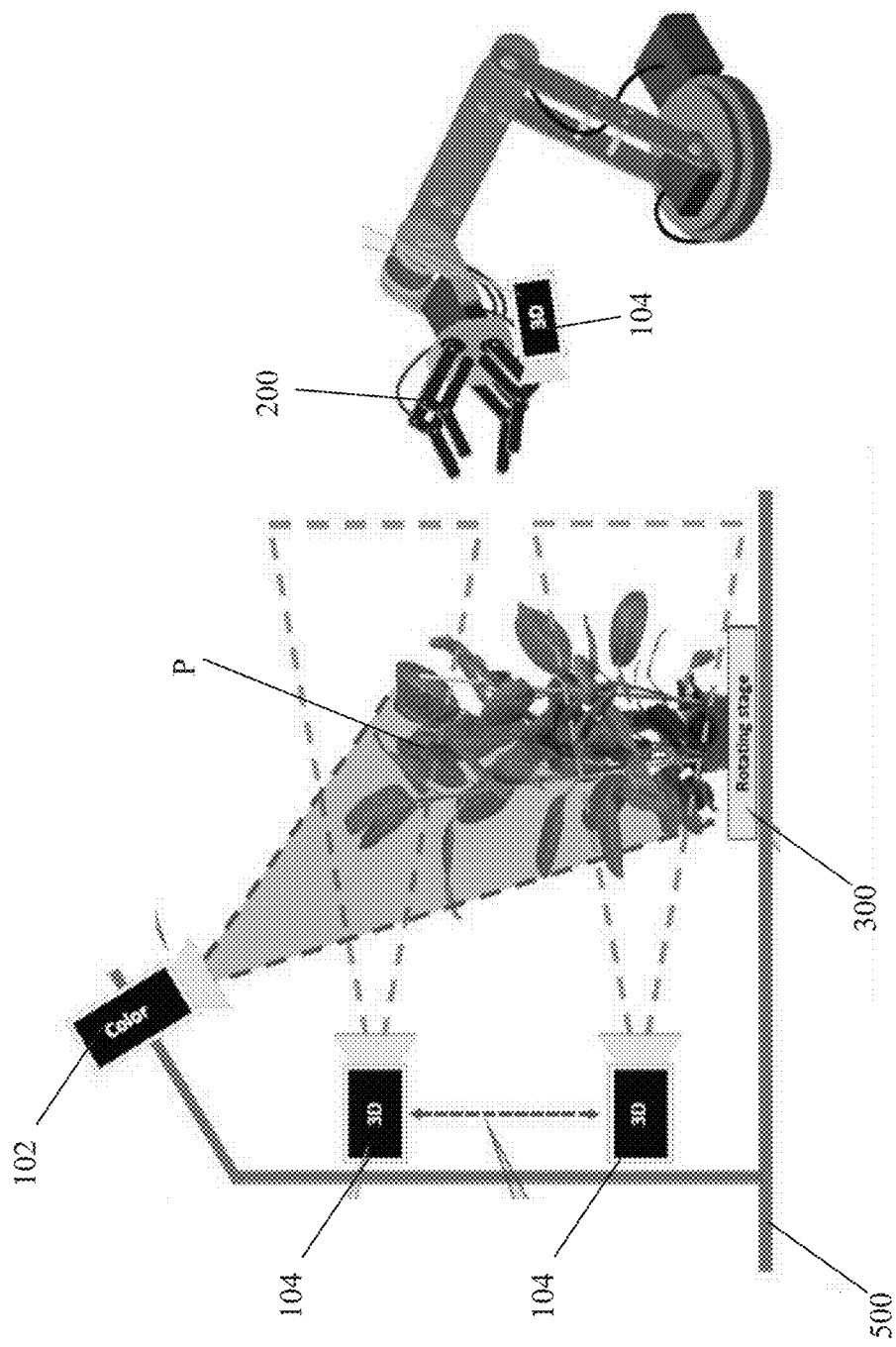
FIG. 4 is another schematic view showing the system.

FIG. 2 is a schematic view showing an exemplary embodiment of the automated plant surveillance and manipulation system 10, in which one or more target plants P are positioned on a sample station 500 of the system 10. FIGS. 3 and 4 are schematic views showing the automated plant surveillance and manipulation system 10 from different perspectives.

The machine vision system 100, as shown in FIGS. 2-4, functions to obtain images of the target plants P. For example, the machine vision system 100 includes a plurality of cameras that are configured to obtain multiple images of the target plants P as controlled by the processor 400.

The processor 400 processes the images of the target plants P to determine one or more desirable tissue candidates C of the target plants P. In addition, the processor 400 further processes the images of the target plants P to determine a position and an orientation for each tissue candidate C. Based on the position and the orientation of each tissue candidate C, the manipulation system 200 is moved to approach each tissue candidate C and operate on the tissue candidate C. For example, the manipulation system 200 can include a cutter for excising each tissue candidate C to obtain a tissue sample S of the tissue candidate C. This process can be controlled by the processor 400. In addition, according to certain embodiments, the manipulation system 200 includes a robotic arm, which is capable of implementing precise and complex operations as instructed and controlled.

The tissue sample S can be subsequently transported by the transportation system 300 to proper locations distanced from the automated plant surveillance and manipulation system 10 for subsequent operations and manipulations of the tissue sample S. The operations and manipulations of the tissue sample S include live processing of the sample. Alternatively, the operations and manipulations of the tissue sample S include destructive processing of the sample.

During operation, to achieve a high throughput of plant sampling and manipulation, the target plants P are typically transported serially or in batches by using the transportation system 300.

The machine vision system 100 and the processor 400 work in concert to automatically acquire plant images and determine exact locations of the plants and the tissue candidates. For this purpose, the machine vision system 100 can include one or more cameras. As shown in FIGS. 2-4, the cameras of the machine vision system 100 can include at least one color camera 102, which is configured to provide color images, multispectral images, and/or hyperspectral images of the target plants P and/or the tissue candidates C. In the shown embodiment, the color camera 102 is provided vertically above the target plants P and, for example, mounted to a top bar of a frame 600 of the sample station 500, such that the color camera 102 can provide color images, multispectral images, and/or hyperspectral images of the top of the target plants P and/or the top of the tissue candidates C.

These color images, multispectral images and/or hyperspectral images of the target plants P and/or the tissue candidates C can be processed by the processor 400 for assessing a property of the tissue candidates C. In addition, these images can be processed to determine the position and the orientation of the tissue candidates C. For example, the tissue candidates C can be a plant part of the target plants P; the property of the tissue candidates C can be a quality of the plant part. For example, the plant part can be a leaf of the target plants P. For example, the quality of the leaf can be the greenness, the size, or the shape of the leaf. For example, the quality can be a spectral signature within or outside the visible range.

As shown in FIGS. 2-4, the machine vision system 100 can include one or more 3D imaging systems 104, which are configured to obtain 3D images of the target plants P and/or the tissue candidates C. In the shown embodiment, two 3D imaging systems 104 are provided at different heights above the sample station 500 and are vertically distanced from each other. For example, the two 3D imaging systems 104 each have a specific detection range for imaging different parts of the target plants P. In addition, a third 3D imaging system 104 can be provided to the manipulation system 200 (for example, associated with the robotic arm of the manipulation system 200).

The 3D images of the target plants P and/or the tissue candidates C can be processed by the processor 400 for assessing a property of the tissue candidates C. In addition, these images can be processed to determine the position and the orientation of the tissue candidates C. For example, the tissue candidates C can be a plant part of the target plants P; the property of the tissue candidates C can be a quality of the plant part. For example, the plant part can be a leaf of the target plants P. For example, the quality of the leaf can be the greenness, the size, or the shape of the leaf. For example, the quality can be a spectral signature within or outside the visible range.

According to certain embodiments, the tissue candidates can be selected from a group consisting of a shoot, a root, a leaf, an apex, a node and an internode of the target plants. In addition, the automated surveillance and manipulation system 10 can be broadly applied to other domains in plant sciences. For example, without being limiting, in addition to detecting and processing the target plants, per se, the automated surveillance and manipulation system 10 can be readily applied to detect and process a medium that anchors the roots of the plants. Stated differently, the anchoring medium (such as, agar, soil, or artificial clay) can be a target subject to the detection and manipulation of the system, depending on the circumstances of applying the system in plant sciences.

In certain embodiments, the color images and/or the 3D images of the target plants P and the tissue candidates C can be processed by the processor 400 to determine a path for moving the manipulation system 200 based on the position and the orientation of the tissue candidates C, such that the manipulation system 200 can process the tissue candidates C to obtain the tissue samples S.

In operation, by using the automated plant surveillance and manipulation system 10, the previously described processes can be implemented repetitively and swiftly to pinpoint the proper locations and orientations of a large volume of target plants P. In addition, for a same target plant, these processes can be implemented repetitively and swiftly to identify and locate multiple plant parts of the same plant. These processes can be implemented through programmed hardware, software algorithms, and the combination thereof.

In addition, the images of the tissue candidates (including different types of plant features) can be saved for future analysis and comparison with the results and can be also used to characterize effects of growth conditions, gene manipulation and/or processing outcomes on plant. A data storage (such as, an internal memory embedded into the processor or an external memory) can be provided for this purpose. Furthermore, the information on the localization of the tissue candidates C (such as, one or more leaves) can be transferred to the manipulation system 200 through a digital interface including but not limited to TCP/IP and seral connection.

Figure 5:
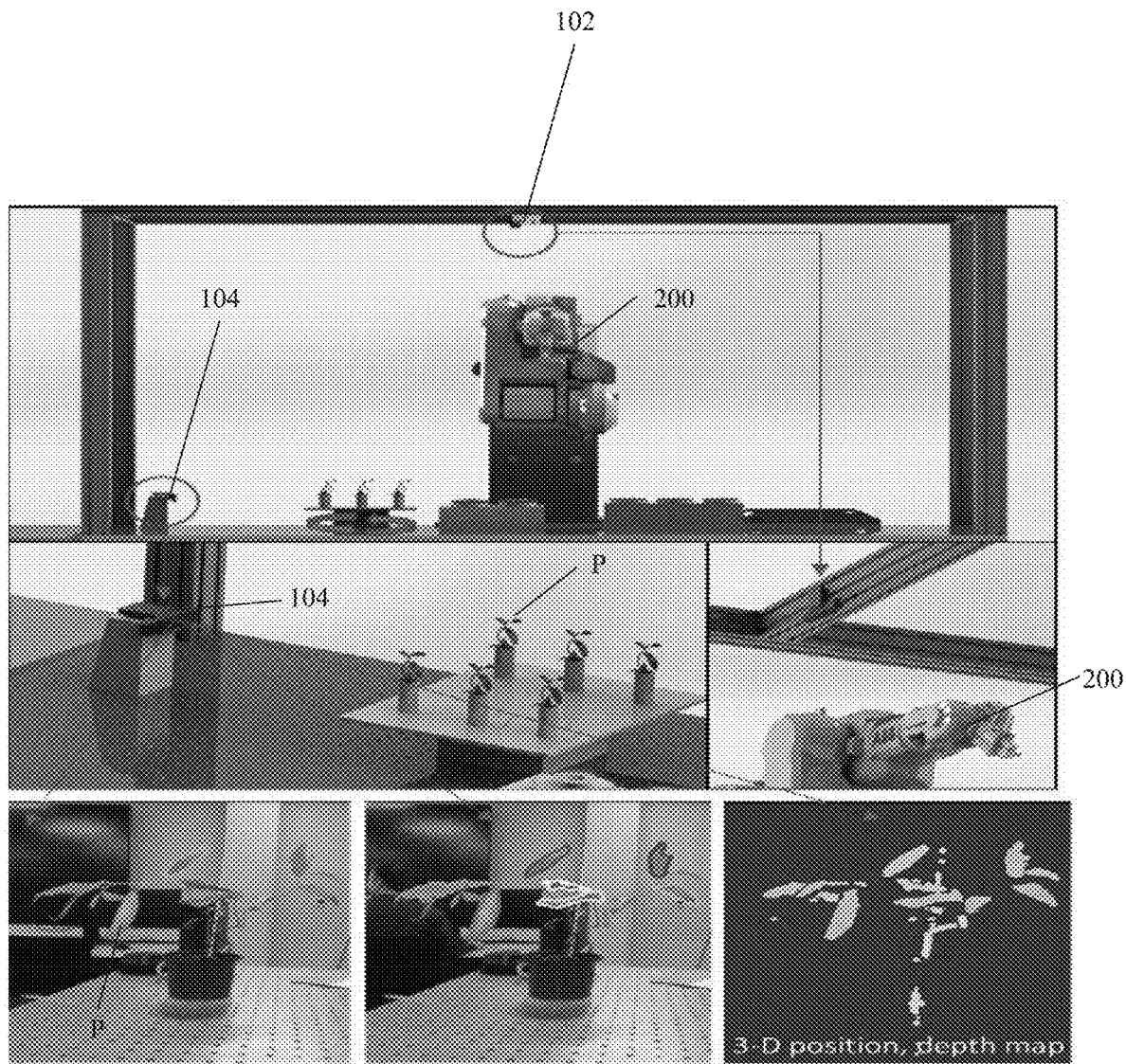
FIG. 5 is a schematic view showing certain examples of image outputs of the system.

FIG. 5 shows the machine vision system 100 and certain examples of image outputs of the machine vision system 100. In this figure, the zoomed-in views of the image outputs are shown at the bottom of the figure.

According to certain embodiments, the transportation system 300 includes automatic conveyors for moving the obtained tissue samples S. In addition, the transportation system 300 also functions to move the target plants P within the frame 600 of the sample station 500. For example, the transportation system 300 can move the target plants P with respect to a detection range of the machine vision system 100, such that images of the target plants P from different angles, perspectives and locations can be obtained to provide sufficient image data that can be used by the processor 400 for determining the tissue candidates C and the position and orientation of each tissue candidate C. The transportation system 300 can include a rotating stage for rotating the target plants P and/or the tissue sample S. The transportation system 300 can further include a translating stage for linearly moving the target plants P and/or the tissue sample S.

Figure 6:
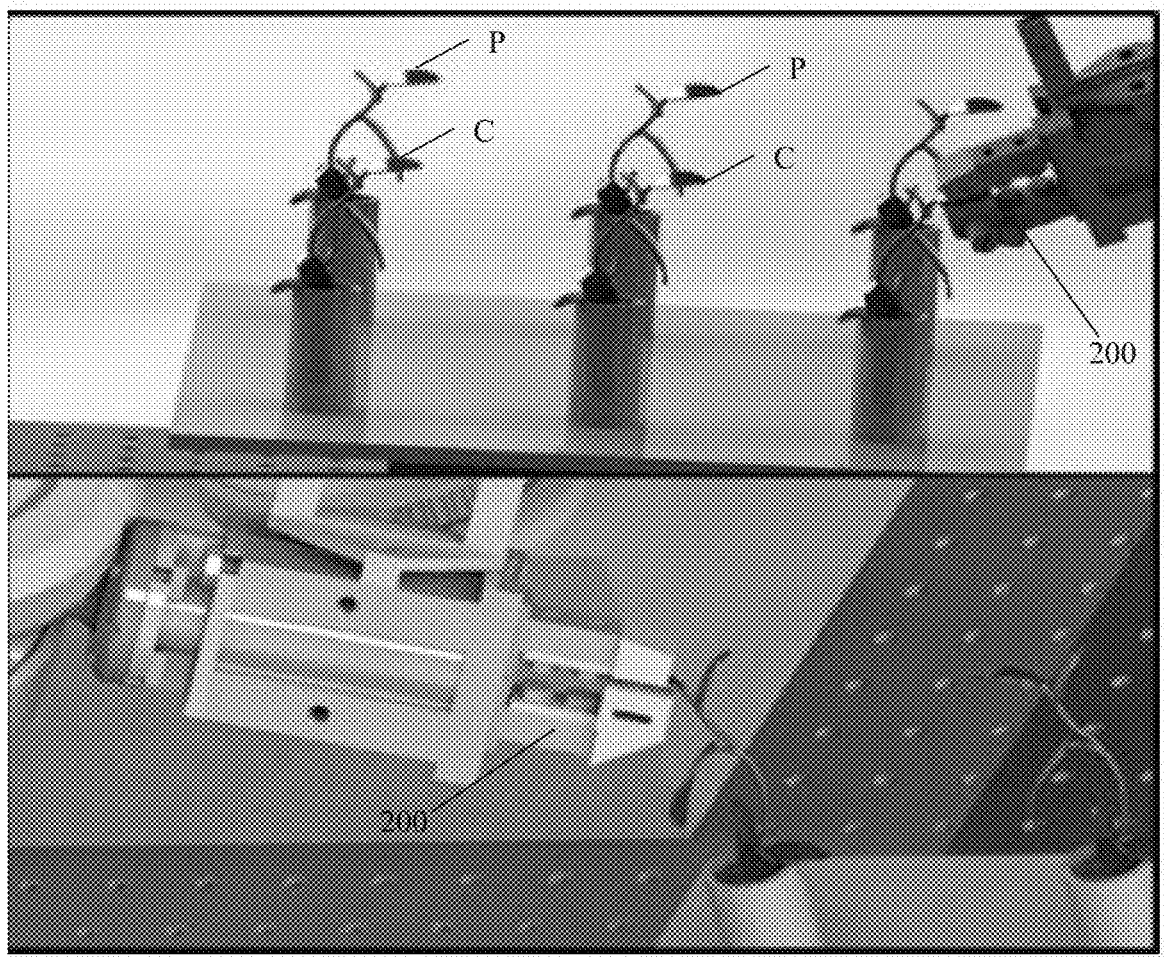
FIG. 6 is a schematic view showing an example of an automated excision mechanism of the system.

Based on the position and the orientation of each tissue candidate C, the manipulation system 200 is controlled by the processor 400 to process the tissue candidates C. For example, the manipulation system 200 can include an actuator station (for example, a robotic manipulator and a gantry system). The manipulation system 200 can further include an automated excision mechanism, associated with the actuating mechanism, for conducting excision and retaining the tissue sample S. The excision mechanism can be electrically, pneumatically, hydraulically, or otherwise actuated, in lieu of manual actuation. As a result, the entire process is completely automated through the processor 400 without requiring human intervention. FIG. 6 shows an example of the automated excision mechanism for consecutively punching and collecting tissue samples S, which can be leaves of the target plants P.

According to certain embodiments, after the acquisition, the tissue samples S can be automatically transported into an infection medium comprising liquid culture of agrobacterium carrying a DNA construct of interest. Alternatively, the tissue samples S can be automatically transported into a sequencing medium. After the tissue samples S are store in the medium, images of the tissue samples can be obtained through the machine vision system 100. Subsequently, the obtained images of the tissue sample S can be processed to determine whether it is necessary or proper to move the tissue samples S into a solid medium. Based on a determination for moving the sample into the solid medium, the tissue samples S are subsequently transported into the solid medium. The solid medium can include a solid callus container for shoot induction.

In addition, according to certain embodiments, the tissue samples S are subjected to transformation. For example, the transformation can be achieved by a method selected from agrobacterium-mediated transformation, viral vector-mediated transformation, polyethylene glycol (PEG)-mediated transformation, liposome-mediated transformation, nanoparticle-mediated transformation, electroporation, and particle gun transformation.

According to certain embodiments, the tissue samples are subjected to destructive processing and extraction.

Figure 7:
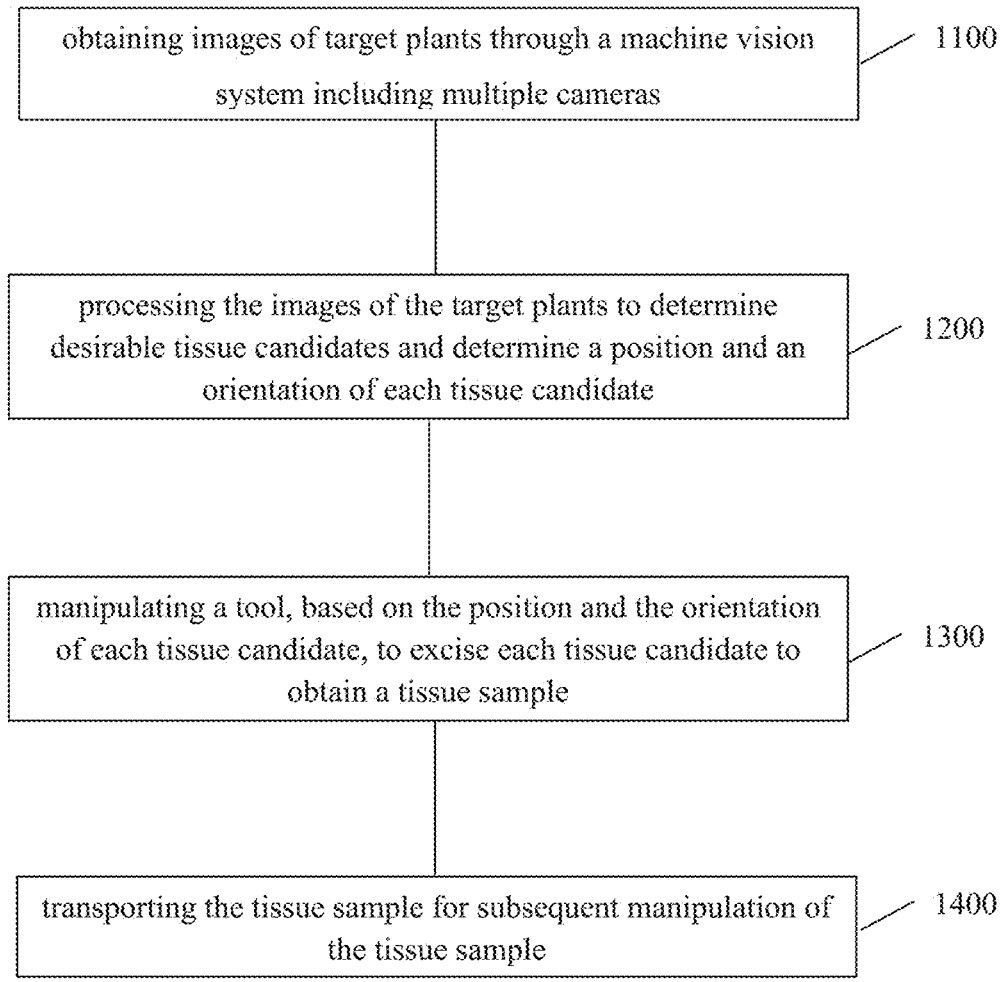
FIG. 7 is a flowchart showing a method for automated plant surveillance and manipulation.

FIG. 7 is a flowchart showing a method 1000 for automated plant surveillance and manipulation. The method 1000 is implementable with the automated plant surveillance and manipulation system 10 as previously described.

The method 1000 includes an element 1100, at which images of the plurality of target plants P are obtained through the machine vision system 100 including multiple cameras 102 and 104. The method further includes an element 1200, at which the obtained images of the target plants P are processed by the processor 400 to determine desirable tissue candidates C and to determine a position and an orientation of each desirable tissue candidate C. The method also includes an element 1300, at which a tool is manipulated based on the position and the orientation of each desirable tissue candidate C to excise the tissue candidate to obtain a tissue sample S. The method additionally includes an element 1400, at which the tissue sample S is transported for subsequent manipulation of the tissue sample. The subsequent manipulation can include live processing of the tissue sample S. The subsequent manipulation can also include destructive processing of the tissue sample S.

At the element 1100, the obtaining the images can include obtaining color images, multispectral images, or hyperspectral images of the target plants through the machine vision system, for assessing a property of each tissue candidate and for determining the position and the orientation of each tissue candidate. In this connection, the cameras includes a color camera being configured to provide the color images, the multispectral images, or the hyperspectral images of the target plants. The obtaining the images can further include obtaining 3D images of the target plants through the machine vision system, for assessing a property of each tissue candidate and for determining the position and the orientation of each tissue candidate. In this connection, the machine vision system includes one or more 3D imaging systems for obtaining the 3D images of the target plants. The method 1000 can further include a sub-element of processing the 3D images to determine a path for moving the tool based on the position and the orientation of each tissue candidate.

The tissue candidate can include a plant part of the target plants and the property can include a quality of the plant part. The plant part can be a leaf. The quality of the leaf can be the greenness, the size, or the shape of the leaf. The quality can be a spectral signature within or outside the visible range.

The method 1000 can further include subjecting the tissue sample S to transformation. The transformation can be achieved by a method selected from agrobacterium-mediated transformation, viral vector-mediated transformation, polyethylene glycol (PEG)-mediated transformation, liposome-mediated transformation, nanoparticle-mediated transformation, electroporation, and particle gun transformation.

The method 1000 can further include subjecting the tissue sample S to destructive processing and extraction.

At the element 1400, the tissue sample can be transported into an infection medium comprising liquid culture of agrobacterium carrying a DNA construct of interest. At the element 1400, the tissue sample can also be transported into a sequencing medium.

The method 1000 can further includes obtaining images of the tissue sample in the medium through the machine vision system, processing the images of the sample to determine whether to move the sample into a solid medium, and based on a determination of moving the sample into the solid medium, transporting the sample into the solid medium. The solid medium includes a solid callus container for shoot induction.

According to the method 1000, the tissue candidates can be each selected from a group consisting of a shoot, a root, a leaf, an apex, a node, and an internode of the target plants.

According to the method 1000, a plurality of target plants are automatically imaged and manipulated to significantly increase the throughput of the manipulation process.

Figure 8:
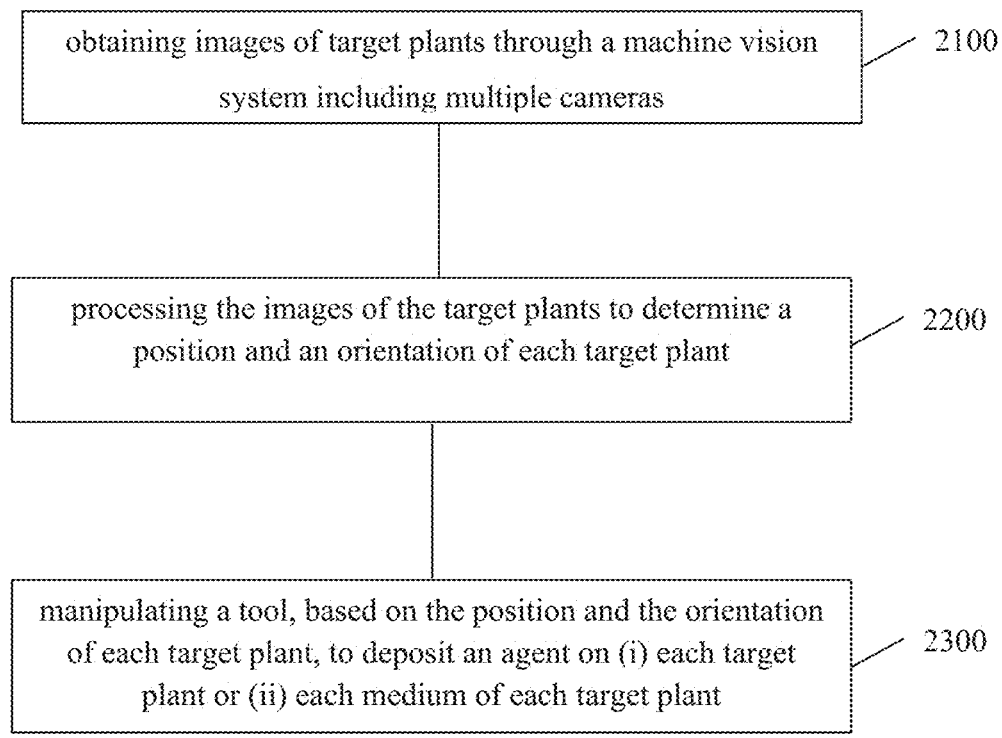
FIG. 8 is a flowchart showing another method for automated plant surveillance and manipulation.

FIG. 8 is a flowchart showing a method 2000 for automated plant surveillance and manipulation. The method 2000 is implementable with the automated plant surveillance and manipulation system 10 as previously described.

The method 2000 includes an element 2100, at which images of the target plants are obtained through the machine vision system having a plurality of cameras. The method 2000 further includes an element 2200, at which the obtained images of the target plants are processed to determine a position and an orientation of each target plant. The method 2000 also includes an element 2300, at which a tool is manipulated, based on the position and the orientation of each target plant, to deposit an agent on (i) each target plant or (ii) the medium of each target plant. According to an embodiment, the agent can be a microbial or chemical agent.

Figure 9:
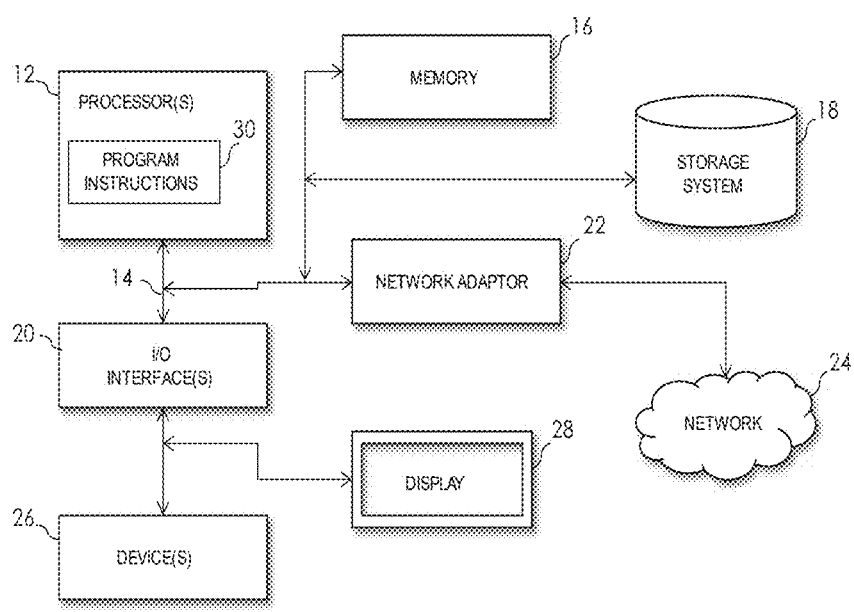
FIG. 9 is a schematic view showing an exemplary computer or processing system that can implement the method and the system for automated plant surveillance and manipulation.

Another aspect of the disclosure provides a system 3000 for automated plant surveillance and manipulation. FIG. 9 illustrates a schematic view of an example computer or processing system that can implement the system for automated plant surveillance and manipulation, according to an embodiment of the disclosure.

The computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more hardware processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof. The processors processing units 12 can include the processor 400 as described previously. Alternatively, the processor 400 can be independent from the processors or processing units 12.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to, microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

According to the system 3000, the hardware processor 12 is configured to obtain images of the target plants through the machine vision system having a plurality of cameras. The processor is further configured to process the images of the target plants to determine tissue candidates of the target plants and to determine a position and an orientation of each of tissue candidate. The processor is further configured to manipulate a tool, based on the position and the orientation of each tissue candidate, to excise each tissue candidate to obtain tissue samples. The processor is additionally configured to transport the sample for manipulation.

According to an embodiment, the hardware processor 12 is further configured to move the target plants through an automatic transportation system with respect to a detection range of the machine vision system. The automatic transportation system includes a rotating stage for rotating the target plants with respect to the detection range of the machine vision system and a translating stage for linearly moving the target plants with respect to the detection range of the machine vision system.

According to an embodiment, the hardware processor 12 is further configured to obtain color images, multispectral images, or hyperspectral images of the target plants, through the machine vision system, for assessing a predetermined property of each tissue candidate and for determining the position and the orientation of each tissue candidate. The plurality of cameras includes a color camera being configured to provide the color images, the multispectral images, or the hyperspectral images of the top of the target plants.

According to an embodiment, the hardware processor 12 is further configured to obtain 3D images of the at least one target plant, through the machine vision system, for assessing a predetermined property of each tissue candidate and for determining the position and the orientation of each tissue candidate. The machine vision system further includes a 3D imaging system for obtaining the 3D images.

According to an embodiment, the hardware processor 12 is further configured to process the 3D images to determine a path for moving the tool based on the position and the orientation of each tissue candidate.

According to an embodiment, the hardware processor 12 is further configured to transport the sample into a transformation medium. The transformation medium includes an infection medium having liquid culture of agrobacterium carrying a DNA construct of interest.

According to an embodiment, the hardware processor 12 is further configured to obtain images of the tissue sample in the liquid medium through the machine vision system; process the images of the tissue sample to determine whether to move the tissue sample into a solid medium; and based on a determination of moving the sample into the solid medium, transport the sample into the solid medium. The solid medium can include a solid callus container for shoot induction.

Another aspect of the disclosure provides a system 4000 for automated plant surveillance and manipulation. The system 4000 can be implemented by the computer system shown in FIG. 9.

According to the system 4000, the hardware processor 12 is configured to obtain images of the target plants through the machine vision system having a plurality of cameras. The hardware processor 12 is further configured to process the images of the target plants to determine a position and an orientation of each target plant. The hardware processor 12 is further configured to manipulate a tool, based on the position and the orientation of each target plant, to deposit an agent on (i) each target plant or (ii) each medium of each target plant.

According to an embodiment, the agent can be a microbial or chemical agent.

Another aspect of the disclosure provides a computer program product 5000 for implementing plant transformation. The computer program product includes a computer readable storage medium having program instructions embodied therewith. The program instructions are executable by a processing element of a device to cause the device to: obtain images of the target plants through the machine vision system having a plurality of cameras; process the images of the target plants to determine tissue candidates of the target plants and to determine a position and an orientation of each tissue candidate; manipulate a tool, based on the position and the orientation of each tissue candidate, to excise each tissue candidate to obtain tissue samples of the tissue candidates; and transport the tissue sample into a liquid medium.

Another aspect of the disclosure provides a computer program product 6000 for implementing plant transformation. The computer program product includes a computer readable storage medium having program instructions embodied therewith. The program instructions are executable by a processing element of a device to cause the device to obtain images of the target plants through the machine vision system having a plurality of cameras; process the images of the target plants to determine a position and an orientation of each target plant; manipulate a tool, based on the position and the orientation of each target plant, to deposit an agent on (i) each target plant or (ii) each medium of each target plant.

According to an embodiment, the agent can be a microbial or chemical agent.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A method for automated plant surveillance and manipulation, comprising:
    obtaining images of at least one target plant through a machine vision system comprising a plurality of cameras;
    processing the images of the at least one target plant to determine at least one tissue candidate of the at least one target plant and to determine a position and an orientation of each of the at least one tissue candidate;
    manipulating a tool, based on the position and the orientation of said each of the at least one tissue candidate, to excise said each of the at least one tissue candidate to obtain a sample of said each of the at least one tissue candidate; and
    transporting the sample for manipulation.

2. The method according to claim 1, wherein the manipulation comprises live processing of the sample.

3. The method according to claim 1, wherein the manipulation comprises destructive processing of the sample.

4. The method according to claim 1, further comprising:
    moving the at least one target plant through an automatic transportation system with respect to a detection range of the machine vision system,
    wherein the automatic transportation system comprises:
        a rotating stage for rotating the at least one target plant with respect to the detection range of the machine vision system; and
        a translating stage for linearly moving the at least one target plant with respect to the detection range of the machine vision system.

5. The method according to claim 1, wherein the obtaining images of the at least one target plant through the machine vision system comprises:
    obtaining color images or multispectral or hyperspectral images of the at least one target plant, through the machine vision system, for assessing a property of said each of the at least one tissue candidate and for determining the position and the orientation of said each of the at least one tissue candidate,
    wherein the plurality of cameras comprises a color camera being configured to provide images of the top of the at least one target plant.

6. The method according to claim 5, wherein the at least one tissue candidate comprises a plant part of the at least one target plant and the property comprises a quality of the plant part.

7. The method according to claim 6, wherein the plant part is a leaf.

8. The method according to claim 6, wherein the quality of the leaf is the greenness, the size, or the shape of the leaf.

9. The method according to claim 6, wherein the quality is a spectral signature within or outside the visible range.

10. The method according to claim 1, wherein the obtaining images of the at least one target plant through the machine vision system comprises:
    obtaining 3D images of the at least one target plant, through the machine vision system, for assessing a property of said each of the at least one tissue candidate and for determining the position and the orientation of said each of the at least one tissue candidate,
wherein the machine vision system further comprises a 3D imaging system for obtaining the 3D images.

11. The method according to claim 10, wherein the at least one tissue candidate comprises a plant part of the at least one target plant and comprises of a property of a plant part.

12. The method according to claim 10, further comprising:
processing the 3D images to determine a path for moving the tool based on the position and the orientation of said each of the at least one tissue candidate.

13. The method according to claim 1, wherein the sample is subjected to transformation.

14. The method according to claim 13, wherein the transformation is achieved by a method selected from agrobacterium-mediated transformation, viral vector-mediated transformation, polyethylene glycol (PEG)-mediated transformation, liposome-mediated transformation, nanoparticle-mediated transformation, electroporation, and particle gun transformation.

15. The method according to claim 1, further comprising subjecting the sample to destructive processing and extraction.

16. The method according to claim 1, wherein the transporting the sample comprises transporting the sample into an infection medium comprising liquid culture of agrobacterium carrying a DNA construct of interest.

17. The method according to claim 1, wherein the transporting the sample comprises transporting the sample into a sequencing medium.

18. The method according to claim 1, further comprising:
obtaining images of the sample in a medium through the machine vision system;
processing the images of the sample to determine whether to move the sample into a solid medium; and
based on a determination of moving the sample into the solid medium, transporting the sample into the solid medium,
wherein the solid medium comprises a solid callus container for shoot induction.

19. The method according to claim 1, wherein the at least one tissue candidate comprises a plurality of tissue candidates each selected from a group consisting of a shoot, a root, a leaf, an apex, a node, and an internode of the at least one target plant.

20. The method according to claim 1, wherein the at least one target plant comprises a plurality of target plants.

21. A method for automated plant surveillance and manipulation, comprising:
obtaining images of at least one target plant through a machine vision system comprising a plurality of cameras;
processing the images of the at least one target plant to determine a position and an orientation of each of the at least one target plant; and
manipulating a tool, based on the position and the orientation of said each of the at least one target plant, to deposit an agent on (i) each of the at least one target plant or (ii) each medium of the at least one target plant.

22. The method according to claim 21, wherein the agent is a microbial or chemical agent.

23. A system for automated plant surveillance and manipulation, comprising:
a hardware processor; and
a memory coupled with the hardware processor,
wherein the hardware processor is configured at least to:
obtain images of at least one target plant through a machine vision system comprising a plurality of cameras;
process the images of the at least one target plant to determine at least one tissue candidate of the at least one target plant and to determine a position and an orientation of each of the at least one tissue candidate;
manipulate a tool, based on the position and the orientation of said each of the at least one tissue candidate, to excise said each of the at least one tissue candidate to obtain a sample of said each of the at least one tissue candidate; and
transport the sample for manipulation.

24. The system according to claim 23, wherein the hardware processor is further configured to:
move the at least one target plant through an automatic transportation system with respect to a detection range of the machine vision system,
wherein the automatic transportation system comprises:
a rotating stage for rotating the at least one target plant with respect to the detection range of the machine vision system; and
a translating stage for linearly moving the at least one target plant with respect to the detection range of the machine vision system.

25. The system of claim 24, further comprising an actuator station that is independent of the tool.

26. The system of claim 23, wherein the tool comprises a robotic arm.

27. The system according to claim 23, wherein the hardware processor is further configured to:
obtain color images or multispectral images or hyperspectral images of the at least one target plant, through the machine vision system, for assessing a predetermined property of said each of the at least one tissue candidate and for determining the position and the orientation of said each of the at least one tissue candidate,
wherein the plurality of cameras comprise a color camera being configured to provide images of the top of the at least one target plant.

28. The system according to claim 23, wherein the plurality of cameras is configured to take color images or multispectral images or hyperspectral images.

29. The system according to claim 23, wherein the at least one tissue candidate comprises a leaf of the at least one target plant and the property comprises a quality of the leaf.

30. The system according to claim 29, wherein the quality of the leaf is the greenness, the size, or the shape.

31. The system according to claim 29, wherein the quality is a spectral signature within or outside the visible range.

32. The system according to claim 27, wherein the hardware processor is further configured to:
obtain 3D images of the at least one target plant, through the machine vision system, for assessing a predetermined property of said each of the at least one tissue candidate and for determining the position and the orientation of said each of the at least one tissue candidate,
wherein the machine vision system further comprises a 3D imaging system for obtaining the 3D images.

33. The system according to claim 32, wherein the at least one tissue candidate comprises a leaf of the at least one target plant and the property comprises a shape of the leaf.

34. The system according to claim 32, wherein the hardware processor is further configured to:
process the 3D images to determine a path for moving the tool based on the position and the orientation of said each of the at least one tissue candidate.

35. The system according to claim 27, wherein the sample is subjected to transformation.

36. The system according to claim 35, wherein the transformation is achieved by a method selected from agrobacterium-mediated transformation, viral vector-mediated transformation, polyethylene glycol (PEG)-mediated transformation, liposome-mediated transformation, nanoparticle-mediated transformation, electroporation, and particle gun transformation.

37. The system according to claim 27, wherein the hardware processor is further configured to transport the sample into a transformation medium.

38. The system of claim 37, wherein the transformation medium is an infection medium comprising liquid culture of agrobacterium carrying a DNA construct of interest.

39. The system according to claim 27, wherein the transporting the sample comprises transporting the sample into a tissue culture medium, an infection medium or a sample preserving medium.

40. The system according to claim 27, wherein the hardware processor is further configured to:
obtain images of the sample in the liquid medium through the machine vision system;
process the images of the sample to determine whether to move the sample into a solid medium; and
based on a determination of moving the sample into the solid medium, transport the sample into the solid medium,
wherein the solid medium comprises a solid callus container for shoot induction.

41. The system according to claim 27, wherein the at least one tissue candidate comprises a plurality of tissue candidates each selected from a group consisting of a shoot, a root, a leaf, an apex, a node, and an internode of the at least one target plant.

42. The system according to claim 27, wherein the at least one target plant comprises a plurality of target plants.

43. A system for automated plant surveillance and manipulation, comprising:
a hardware processor; and
a memory coupled with the hardware processor,
wherein the hardware processor is configured at least to:
obtain images of at least one target plant through a machine vision system comprising a plurality of cameras;
process the images of the at least one target plant to determine a position and an orientation of each of the at least one target plant; and
manipulate a tool, based on the position and the orientation of said each of the at least one target plant, to deposit an agent on (i) each of the at least one target plant or (ii) each medium of the at least one target plant.

44. The system according to claim 43, wherein the agent is a microbial or chemical agent.

45. A computer program product for implementing plant transformation, the computer program product comprising a computer readable storage medium having program instructions embodied therewith, the program instructions executable by a processing element of a device to cause the device to:
obtain images of at least one target plant through a machine vision system comprising a plurality of cameras;
process the images of the at least one target plant to determine at least one tissue candidate of the at least one target plant and to determine a position and an orientation of each of the at least one tissue candidate;
manipulate a tool, based on the position and the orientation of said each of the at least one tissue candidate, to excise said each of the at least one tissue candidate to obtain a sample of said each of the at least one tissue candidate; and
transport the sample for manipulation.

46. A computer program product comprising a computer readable storage medium having program instructions embodied therewith, the program instructions executable by a processing element of a device to cause the device to:
obtain images of at least one target plant through a machine vision system comprising a plurality of cameras;
process the images of the at least one target plant to determine a position and an orientation of each of the at least one target plant; and
manipulate a tool, based on the position and the orientation of said each of the at least one target plant, to deposit an agent on (i) each of the at least one target plant or (ii) each medium of the at least one target plant.

47. The computer program according to claim 46, wherein the agent is a microbial or chemical agent.

48. A method for automated surveillance and manipulation, comprising:
obtaining images of at least one target subject through a machine vision system comprising a plurality of cameras;
processing the images of the at least one target subject to determine at least one part of the at least one target subject and to determine a position and an orientation of each of the at least one part;
manipulating a tool, based on the position and the orientation of said each of the at least one part, to obtain a sample of each of the at least one part to obtain a sample of said each of the at least one part; and
transporting the sample for manipulation.

49. The method of claim 48, wherein said target subject is a target plant, and said part is a tissue candidate of the target plant.

50. The method of claim 48, wherein said target subject is a target anchoring media supporting a plant, and wherein the at least one part of the anchoring media is a solid, gel-like or particulate matter such as agar, phytagel, sand, soil or artificial soil.

* * * * *